United States Patent [19]
Metz

[11] Patent Number: 5,016,848
[45] Date of Patent: May 21, 1991

[54] PYRAMIDAL SHAPED BALLOON HOLDER

[76] Inventor: Kurt W. Metz, 83 Mineola Rd., Fox Lake, Ill. 60020

[21] Appl. No.: 394,972

[22] Filed: Aug. 17, 1989

[51] Int. Cl.$^5$ .................................. F16M 11/00
[52] U.S. Cl. .................................. 248/176; 248/346; 248/910; 248/500; 446/220
[58] Field of Search ............ 248/121, 146, 176, 309.1, 248/346, 450, 500, 910; 40/120, 606; 446/71, 220

[56] References Cited

U.S. PATENT DOCUMENTS

| | | | |
|---|---|---|---|
| 3,690,620 | 9/1972 | Matson et al. | 248/910 X |
| 3,794,279 | 2/1974 | Kramer | 248/160 X |
| 4,296,693 | 10/1981 | Archer | 248/910 X |
| 4,813,902 | 3/1989 | Messer | 446/71 |

*Primary Examiner*—Ramon O. Ramirez
*Attorney, Agent, or Firm*—Charles F. Meroni, Jr.

[57] ABSTRACT

A helium party balloon holder comprising a base plate. A pyramidally shaped cap member mounted on the base plate. The cap member being truncated and having an uppermost flat surface. An arch-shaped member secured with the flat surface to enable balloon strings to be attached thereto. Fasteners between the cap member and the base plate enabling these components to be attached in snug assembly. A chamber defined between the base plate and the cap member for receiving a ballast within the chamber to affix the helium party balloon holder in place thus enabling a predetermined number of balloons to be secured to the helium party balloon holder.

20 Claims, 3 Drawing Sheets

PYRAMIDAL SHAPED BALLOON HOLDER

BACKGROUND OF THE INVENTION

The present invention relates to a helium party balloon holder which in this instance is of a pyramidal shape. The helium party balloon holder when loaded with ballast or sand is constructed so as to be capable of having two dozen mylar or latex balloons tied to it to enable the balloons to be displayed after being purchased.

The helium party balloon holder is of a hollow multi-part construction and is so constructed that the store owner can fill the helium party balloon holder with sand so that balloons can be attached to the helium party balloon holder in readiness for use or purchase by a customer.

The multi-part helium party balloon holder is so constructed that it has a bottom plate or cover with four pegs or upright pins that are so configurated as to be capable of being telescoped and snugly and securely press fitted into four holes in the underside of a component identified as a pyramidally shaped cap member. The upper side of the cap member is truncated and provided with an arch-shaped member or loop. This loop is where the strings of the balloons are adapted to be secured.

It is believed that my helium party balloon holder is particularly advantageous over any and all devices that are presently known to exist in that it can be sold in a gift shop or a florist shop where helium balloons are offered for sale. The helium party balloon holder can be sold to the individual consumer or to special groups such as car dealers, marinas where they can purchase balloons for promotional purposes, and the like. The helium party balloon holders allow the owner to display balloons on tables, desks or shelves. By storing the balloons on helium party balloon holders, the balloons can be kept in a tidy way, and it will no longer be necessary for them to be held in place by a ceiling or to be tied to furniture or door handles and the like.

Another advantage of my new pyramidal-shaped helium party balloon holder concerns the fact that one or all of its four sides can be decorated with a multitude of sayings, such as "Happy Retirement", "Happy Birthday", "Congratulations", and etc.

SUMMARY OF INVENTION

According to my invention I have provided a helium party balloon holder having a base plate, a pyramidally shaped cap member mounted on the base plate, the cap member being truncated and having an uppermost flat surface, an arch-shaped member secured with the flat surface to enable balloon strings to be attached thereto, means between the cap member and the base plate enabling these components to be attached in snug assembly, and a chamber defined between the base plate and the cap member for receiving a ballast within the chamber to affix the helium party balloon holder in place thus enabling a predetermined number of balloons to be secured to the helium party balloon holder.

Other features of my invention relate to the cap member having finger-like projections along one side of the cap member for supporting a greeting card in assembly with the cap member.

Another feature of my invention relates to the attachment means including upright pins on the base for enabling the components to be attached, the cap member having sockets at a lower end of the cap member and with the upright pins on the base plate being engageable in the sockets to secure the base plate in assembly with the cap member.

Yet other features of my invention relate to the cap member having upstanding finger-like projections along one side of the cap member for supporting a greeting card in assembly with the cap member, the cap member and the base plate being comprised of a synthetic plastic material, the base plate having the upright pins formed integral with the base plate and from the synthetic plastic material, the cap member having thickened bosses projecting into the chamber and with the sockets being located in the thickened bosses, the upstanding finger-like projections being engageable in the sockets for retaining the base plate and the cap member in unitary assembly.

Other and still further features of my invention relate to the arch-shaped member having attachment means at its opposite ends for retaining the arch-shaped member in unitary assembly with the flat surface on the cap member, the flat surface having a pair of openings, and with the attachment means for retaining the arch-shaped member being engageable with the openings for securing the arch shaped member in unitary assembly with the cap member, the means for securing the arch-shaped member with the flat surface comprising a pair of conical heads formed integral with the arch-shaped member, the conical heads being joined with the arch-shaped member by reduced sections having diameters, the arch-shaped member having a larger diameter than the diameters of the reduced sections, the openings in the the flat surface having diameters corresponding to the diameters of the reduced sections thus enabling said conical retaining heads to be projected through the openings in the uppermost flat surface in retained assembly therewith and with the reduced sections providing plugs in the openings to prevent ballast from escaping.

BRIEF DESCRIPTION OF THE DRAWINGS

Other objects and features at the present invention will become more fully apparent in view of the following detailed description taken in conjunction with the accompanying drawings illustrating a preferred embodiment, as follows.

DESCRIPTION OF A PREFERRED EMBODIMENT

Figure 1:
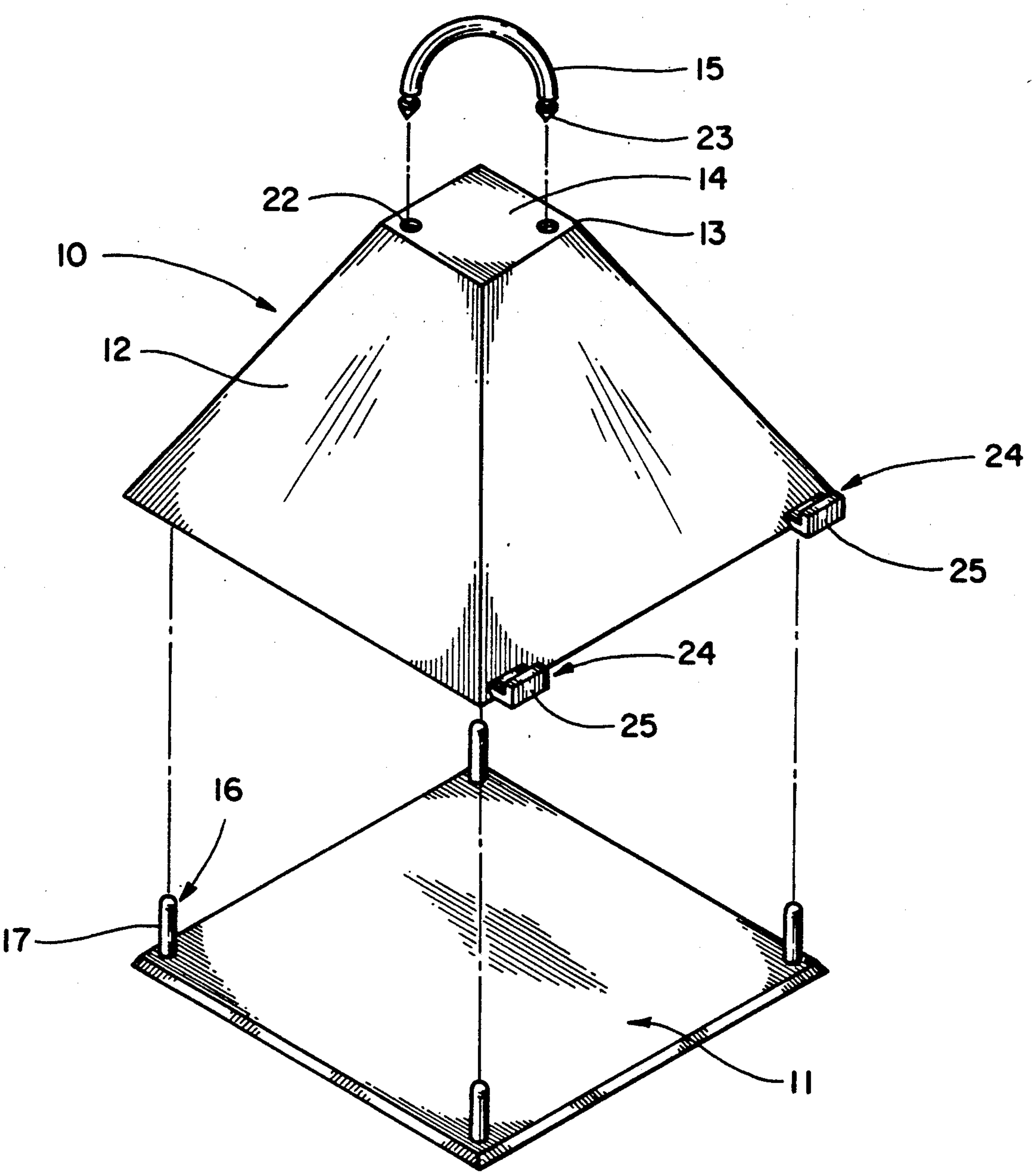
FIG. 1 is an enlarged exploded view of my pyramidally shaped helium party balloon holder.
Figure 2:
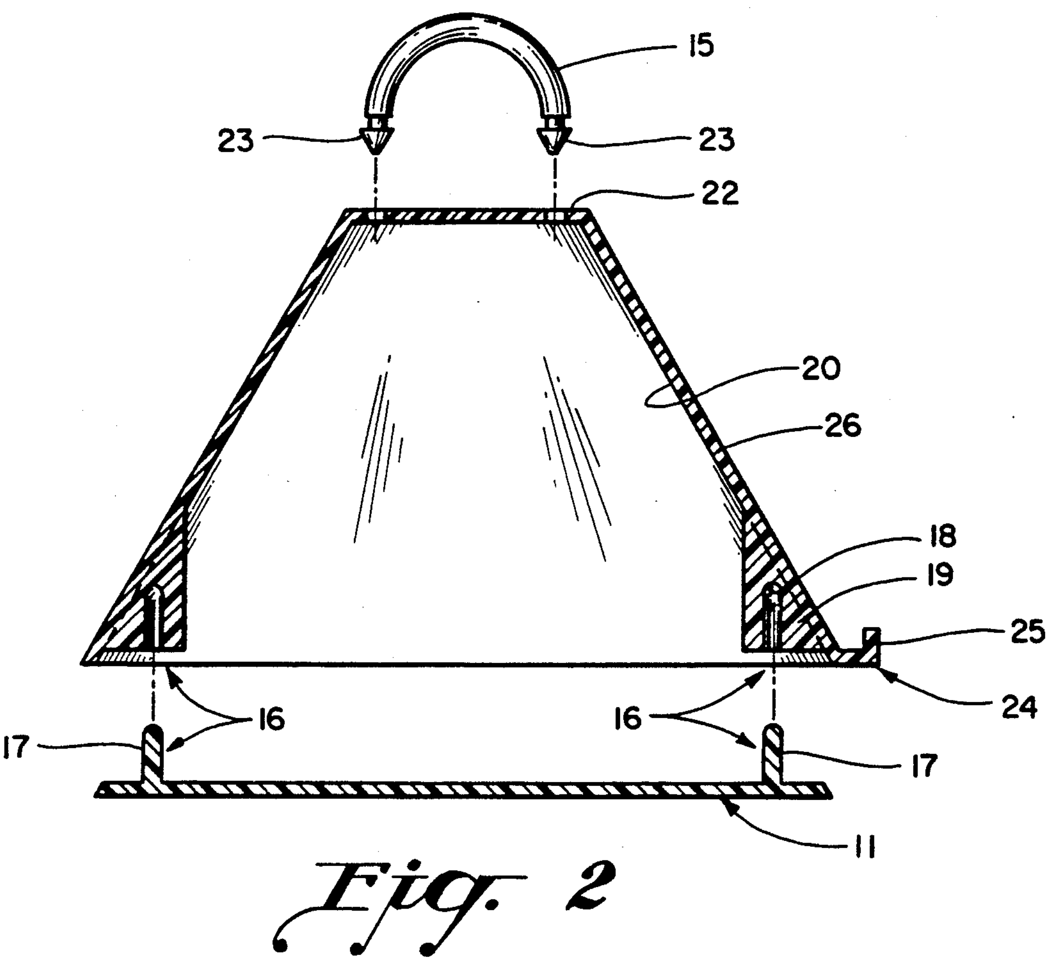
FIG. 2 is an exploded vertical section of the helium party balloon holder shown in FIG. 1.

The reference numeral 10 indicates generally my helium party balloon holder 10 which is preferably of a pyramidal shape. The helium party balloon holder 10 is of a multi-part construction and includes a base plate 11 and a pyramidally shaped upper section or cap member 12 which is mounted on the base plate 11. The cap member 12 is truncated at 13 to provide an uppermost flat surface 14. An arch-shaped balloon tie member or loop 15 is secured with the flat surface 14 to enable balloon strings to be attached to the member 15.

Figure 5:
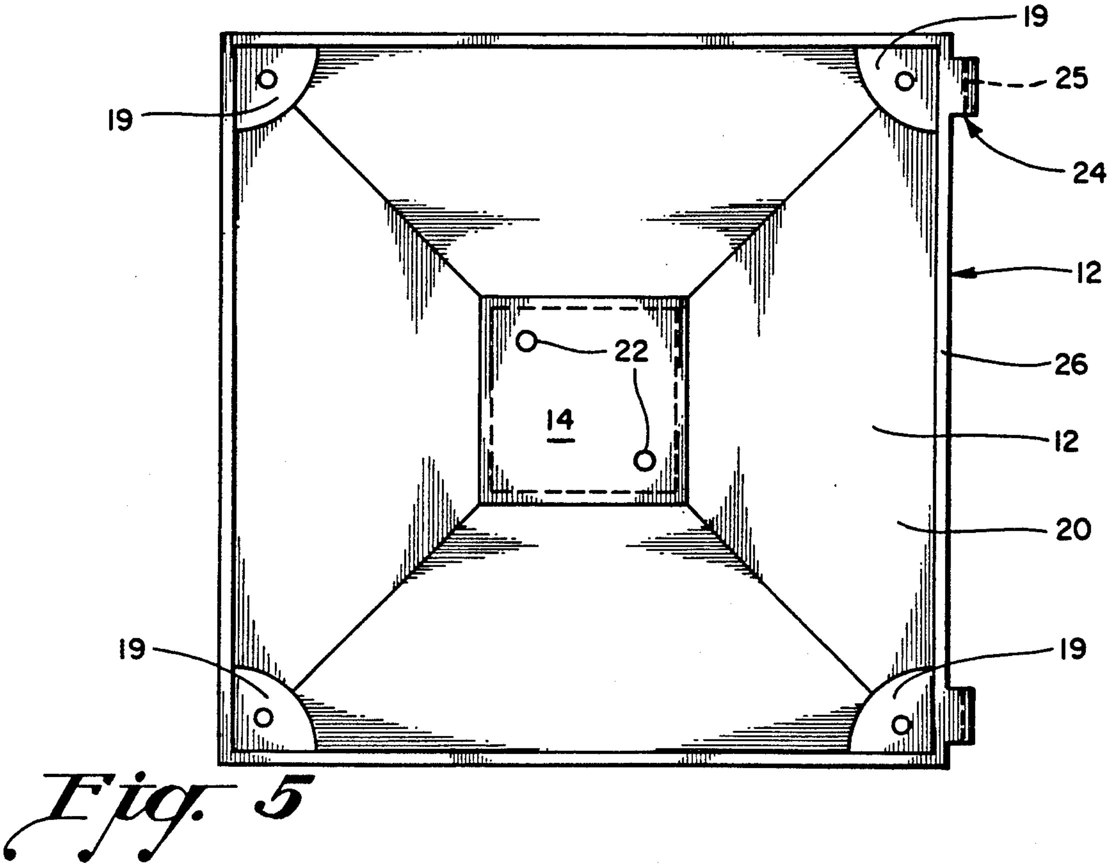
FIG. 5 is a bottom view of the cap member shown in FIG. 4.

The fasteners 16 are provided for securing the base plate 11 and the cap member 12 in assembly together. To this end, the fasteners 16 include four pegs or posts 17 provided on the base plate 11 and four peg or pin holes 18 (FIG. 3) provided in the underside lower edge area of the cap member 12 as shown in FIG. 5. The four posts 17 are adapted to be press fit into the four (4) holes on the under side of the cap member or body 12. The pegs or posts 17 and the pin holes or sockets 18, when telescopingly engaged together, provide a means to enable the base plate and the cap member to be attached in snug assembly together so that sand or ballast cannot readily leak from the bottom. The cap member 12 has four thickened interior bosses 19 at its four corners and the peg holes 18 are located therein.

The helium party balloon holder 10 is preferably comprised of a suitable synthetic plastic. The cap member 12 defines an internal ballast chamber 20 for receipt of ballast or sand 21 to anchor the balloon holder 10.

The helium party balloon holder 10 is preferably ejection molded using high density polyethylene with color added. The sides of the helium party balloon holder 10 may be provided with mylar adhesive that will be attached when purchased. This angled front face of the standard base will have a chrome mylar adhesive that will be attached when purchased.

Both styles of chrome mylar adhesive will be printed with a multitude of sayings such as "Happy Birthday", "I Love You", and the like that will match with the type of mylar balloon one would purchase.

Again, these are very attractive pieces to display your balloon at eye level rather than bouncing on the ceiling or having to attach to furniture or door knobs.

Figure 3:
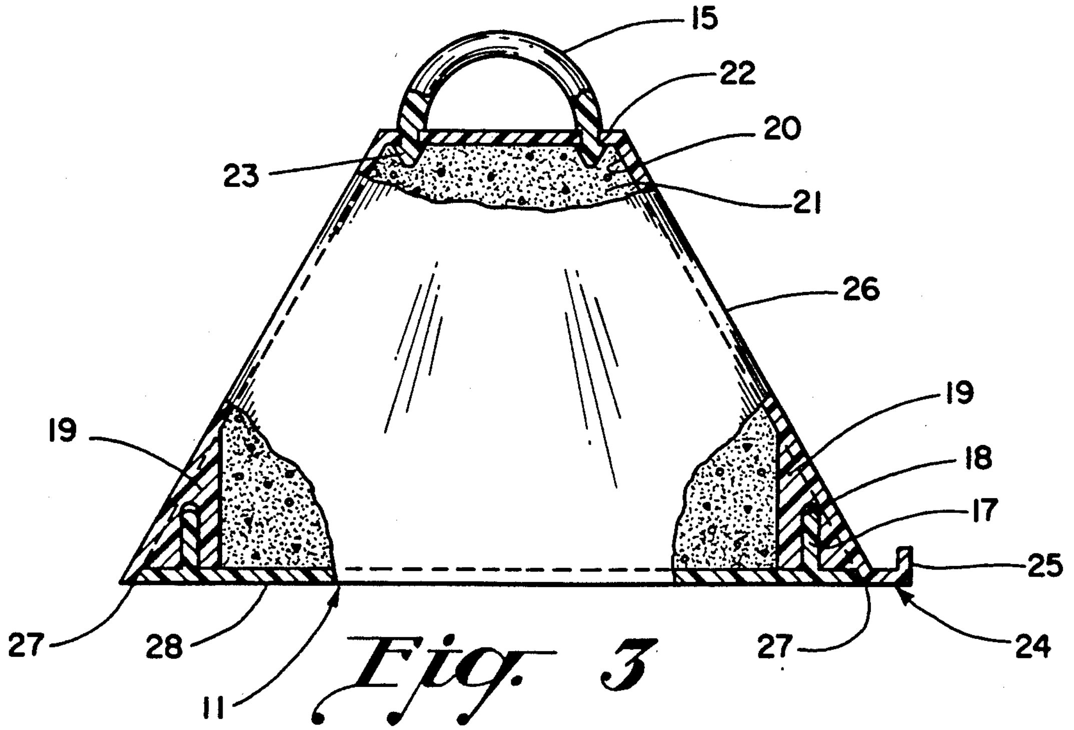
FIG. 3 is a side elevation with parts broken away and shown in cross sections illustrating the helium party balloon holder of FIG. 1 filled with ballast or sand.
Figure 4:
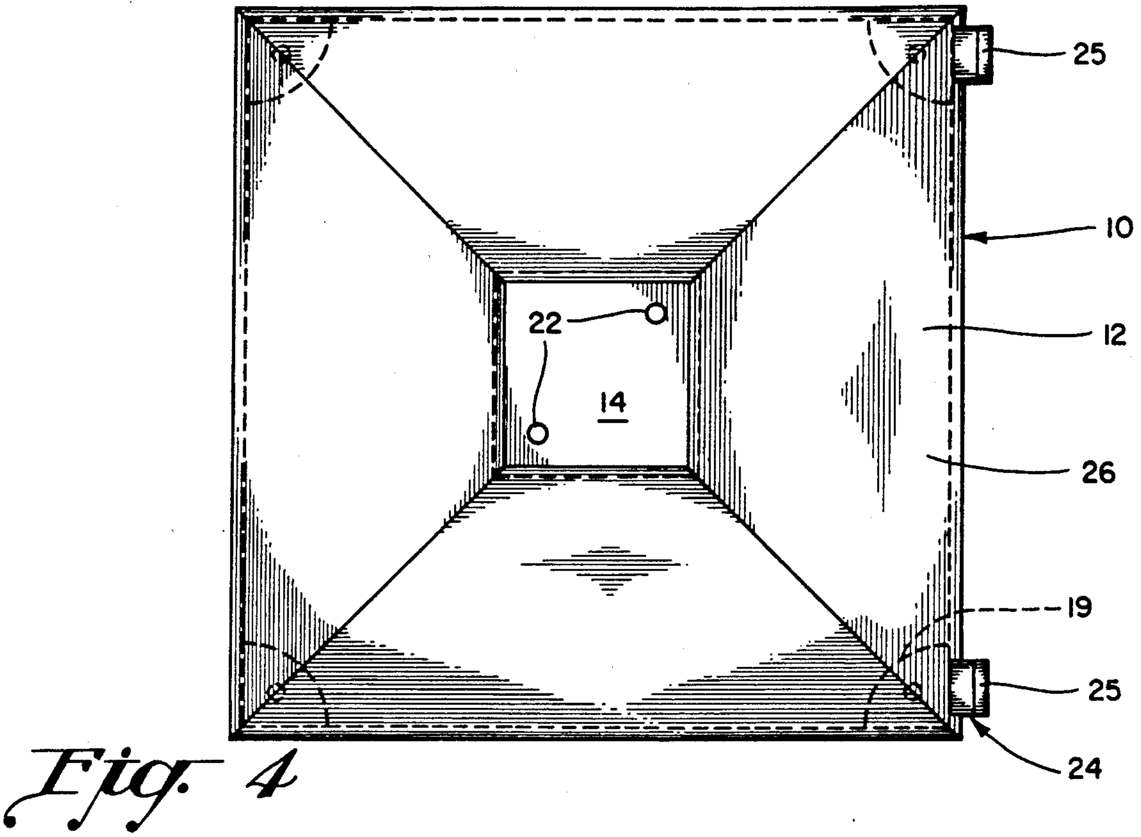
FIG. 4 is a top plan view of the cap member shown in FIG. 1 with the arch-shaped member or loop removed.

An important dimensional relationship pertains to round holes 22 on top of the pyramidal shaped balloon holder 10, and the arrow-shaped heads or retainers 23 formed on opposite ends of the semi-circular ring or arch-shaped member 15. Reduced neck sections 23*a* join the arrow-shaped heads to opposite ends of the arcuate loop 15. The arrow-shaped or conical heads or retainers 23 must be sized so that they will snap into place when they are pushed into the openings. The arrow-shaped heads or retainers 23 are adapted to snap into the holes 22 and the reduced neck sections 23*a* are to be lodged and engaged with the edges defining the holes 22 as seen in FIG. 3 thus providing a snap fit. The snug fit must be obtained so that sand cannot leak out of the balloon holder in the event that the balloon holder 10 is turned upside down similar to a salt and pepper shaker, and the snug fit must be sufficient to hold the arch-shaped balloon retainer member or loop 15 and to hold twenty-four (24) or more balloons in place when balloon strings are attached with the retainer member or loop 15 to the helium party balloon holder. It should be understood that these helium party balloon holders 10 are to be used exclusively with helium filled balloons as opposed to regular atmosphere. These types of balloons are known as "helium party balloons".

The balloon holder 10 and more particularly the cap member 12 is provided with L-shaped greeting card retainer fingerlike projections or lugs 24,24 which include upstanding legs 25,25. The lugs 24 depend from one of four sides 26 of the cap member 12. The lugs are formed integral with the cap member as part of the synthetic plastic cap member in integral assembly therewith. The upright card retainer legs 25 provide a means for holding the greeting card at the bottom of the greeting card (not illustrated). The greeting card can rest against the inclined side 26 of the cap member 12 and yet be firmly secured to the cap member 12 since the lugs 24,24 are spaced sufficiently apart to provide a good solid support base for the greeting card.

As a final feature of my invention, the bosses 19 are integrally formed on an inside wall of the sides 26 and spaced above bottom edges 27 on each of the sides so that when the base plate 11 is engaged with the cap member 12 and with the pegs 17 telescoped into the peg holes 18, the base plate 11 will be snuggly telescopingly fit into the cap member with a bottom surface 28 of the base plate being disposed in a common plane co-planer with lower edges 27 of the sides 26. By constructing the cap member and the base plate in this manner, the parts can be snuggly and reliably attached with one another so that sand cannot readily leak from the joint formed between the base plate 11 and the cap member 12 where these components are engaged in assembly when the lugs 17 are pushed into the holes 18.

The side of the pyramid will be decorated by means of hot stamping or silk screening or pad printing on one of two sides, or possibly four sides with various sayings. There are no decorations on the top.

It is contemplated that an elongated groove (not here illustrated) can be provided in the top of the base of sufficient depth so that the greeting card can rest in the groove as illustrated in my companion co-pending U.S. patent application Ser. No. 07/394,813; now abandoned.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. A helium party balloon holder comprising a base plate, a pyramidal shaped cap member mounted on the base plate, the cap member being truncated and having an uppermost flat surface, an arch-shaped member secured with said flat surface to enable balloon strings to be attached thereto, means between said cap member and said base plate enabling these components to be attached, in snug assembly, and a chamber defined between said base plate and said cap member for receiving a ballast within the chamber to affix the helium party balloon holder in place thus enabling a predetermined number of balloons to be secured to the helium party balloon holder.

2. The helium party balloon holder according to claim 1 further comprised by said cap member having finger-like projections along one side of the cap member for supporting a greeting card in assembly with the cap member.

3. The helium party balloon holder according to claim 1 further comprised by said means including upright pins on said base, the cap member having sockets at a lower end of the cap member and with said upright pins on said base plate being engageable in said sockets to secure the base plate in assembly with the cap member.

4. The helium party balloon holder according to claim 1 further comprised by said cap member having finger-like projections along one side of the cap member for supporting a greeting card in assembly with the cap member, the cap member and the base plate being comprised of a synthetic plastic material, the base plate having said upright pins formed integral with the base plate and from the synthetic plastic material, the cap member having thickened bosses projecting into said chamber and with said sockets being located in said thickened bosses, the upstanding finger-like projections being engageable in said sockets for retaining the base plate and the cap member in unitary assembly.

5. The helium party balloon holder according to claim 1 further comprised by said means including upright pins on said base, the cap member having sockets at a lower end of the cap member and with said upright pins on said base plate being engageable in said sockets to secure the base plate in assembly with the cap member, the cap member and the base plate being comprised of a synthetic plastic material, the cap member having thickened bosses projecting into said chamber and with said sockets being located in said thickened bosses.

6. The helium party balloon holder according to claim 1 further characterized by said arch-shaped member having attachment means at its opposite ends for retaining said arch-shaped member in unitary assembly with said flat surface on said cap member, said flat surface having a pair of openings, and with said attachment means for retaining said arch-shaped member being engageable with said openings for securing the arch shaped member in unitary assembly with said cap member.

7. The helium party balloon holder according to claim 6 further characterized by said means for securing the arch-shaped member with said flat surface comprising a pair of conical heads formed integral with said arch-shaped member, said conical heads being joined with said arch-shaped member by reduced sections having diameters, said arch-shaped member having a larger diameter than the diameters of said reduced sections, said openings in the said flat surface having diameters corresponding to the diameters of said reduced sections thus enabling said conical retaining heads to be projected through said openings in said uppermost flat surface in retained assembly therewith and with said reduced sections providing plugs in said openings to prevent ballast from escaping.

8. A helium party balloon holder of a multi-part construction comprising a base plate, a generally cup-shaped, closed cap member mounted on the base plate, an arch-shaped loop member secured on an upper end of said (with) said cap member to enable balloon strings to be attached thereto, means between said cap member and said base plate enabling these components to be attached in snug assembly, and a completely closed chamber defined between said base plate and said cap member for receiving ballast within the chamber to affix the helium party balloon holder in place thus enabling a predetermined number of balloons to be secured to the helium party balloon holder.

9. The helium party balloon holder according to claim 8 further comprised by said cap member having finger-like projections along one side of the cap member for supporting a greeting card in assembly with the cap member.

10. The helium party balloon holder according to claim 8 further comprised by said means including upright pins on said base, the cap member having sockets at a lower end of the cap member and with said upright pins on said base plate being snugly engageable in said sockets to secure the base plate in assembly with the cap member to prevent ballast from leaking from between the base plate and the cap member.

11. The helium party balloon holder according to claim 8 further comprised by said cap member having finger-like projections along one side of the cap member for supporting a greeting card in assembly with the cap member, the cap member and the base plate being comprised of a synthetic plastic material, the base plate having said upright pins formed integral with the base plate and from the synthetic plastic material, the cap member having thickened bosses projecting into said chamber and with said sockets being located in said thickened bosses, the upstanding finger-like projections being engageable in said sockets for retaining the base plate and the cap member in unitary assembly.

12. The helium party balloon holder according to claim 8 further comprised by said means including upright pins on said base, the cap member having sockets at a lower end of the cap member and with said upright pins on said base plate being engageable in said sockets to secure the base plate in assembly with the cap member, the cap member and the base plate being comprised of a synthetic plastic material, the cap member having thickened bosses projecting into said chamber and with said sockets being located in said thickened bosses, the cap member having bottom edges extended beneath said bosses and with said base plate being snugly engaged against the bosses co-planar with said bottom edges of the cap member.

13. A helium party balloon holder comprising a base plate, a hollow cap member mounted on the base plate, a loop-shaped member secured-with said cap member to enable balloon strings to be attached thereto, means securing opposite ends of said loop-shaped member in sand-tight relation with said cap member to prevent leakage means between said cap member and said base plate enabling these components to be attached in snug sand-tight assembly to prohibit sand leakage, and a chamber defined between said base plate and said hollow cap member for receiving sand within the chamber to affix the helium party balloon holder in place thus enabling a predetermined number of balloons to be secured to the helium party balloon holder.

14. The helium party balloon holder according to claim 13 further comprised by said holder having finger-like projections along one side of the cap member for supporting a greeting card in assembly with the holder.

15. The helium party balloon holder of claim 13 further characterized by the cap member and the base plate having beveled marginal edges which are engageable together to form a tight fit when said means between said cap member and said base plate are attached in snug sand-type assembly to prohibit sand leakage.

16. A helium party balloon holder of a multi-part construction comprising a base plate having an annular plate edge, a cap member mounted on the base plate, said cap member having an annular cap edge, an arch-shaped loop member secured with said cap member to enable balloon strings to be attached thereto, a chamber defined between said base plate and cap member for receiving ballast within the chamber to affix the helium party balloon holder in place thus enabling a predetermined number of balloons to be secured to the helium party balloon holder, and means between said cap member and said base plate enabling said annular plate edge and annular cap edge to be attached in snug assembly for confining ballast in said chamber.

17. The helium party balloon holder of claim 16 further characterized by said annular plate edge and said annular cap edge being beveled so as to be engageable together to form a tight fit enabling said means between said cap member and said base plate to provide a snug sand-light engagement between said annular plate edge and said annular cap edge to prohibit sand leakage from said chamber.

18. The helium party balloon holder according to claim 16 further comprised by said cap member having finger-like projections along one side of the cap member for supporting a greeting card in assembly with the cap member.

19. The helium party balloon holder of claim 16 further characterized by said cap member having a truncated flat surface on an upper end of said cap member, and said arch-shaped loop member being mounted upright on said truncated flat surface.

20. A helium party balloon holder of a multi-part construction said holder having a closed chamber with a removable bottom, the chamber being adapted to receive sand for acting as ballast to hold the holder in place when balloons are attached to the holder, and a balloon attachment member mounted on an upper end of said holder to which balloon strings can be attached whereby the balloon holder acts as an anchor when the chamber is filled with ballast to hold the helium balloons in place.

* * * * *